J. GIRLOT.
METHOD OF MANUFACTURING BY FORGING OR MATRICING CIRCULAR PIECES OF WORK WITH A PROFILED PERIPHERY.
APPLICATION FILED NOV. 22, 1910.
1,068,236.
Patented July 22, 1913.
2 SHEETS—SHEET 1.
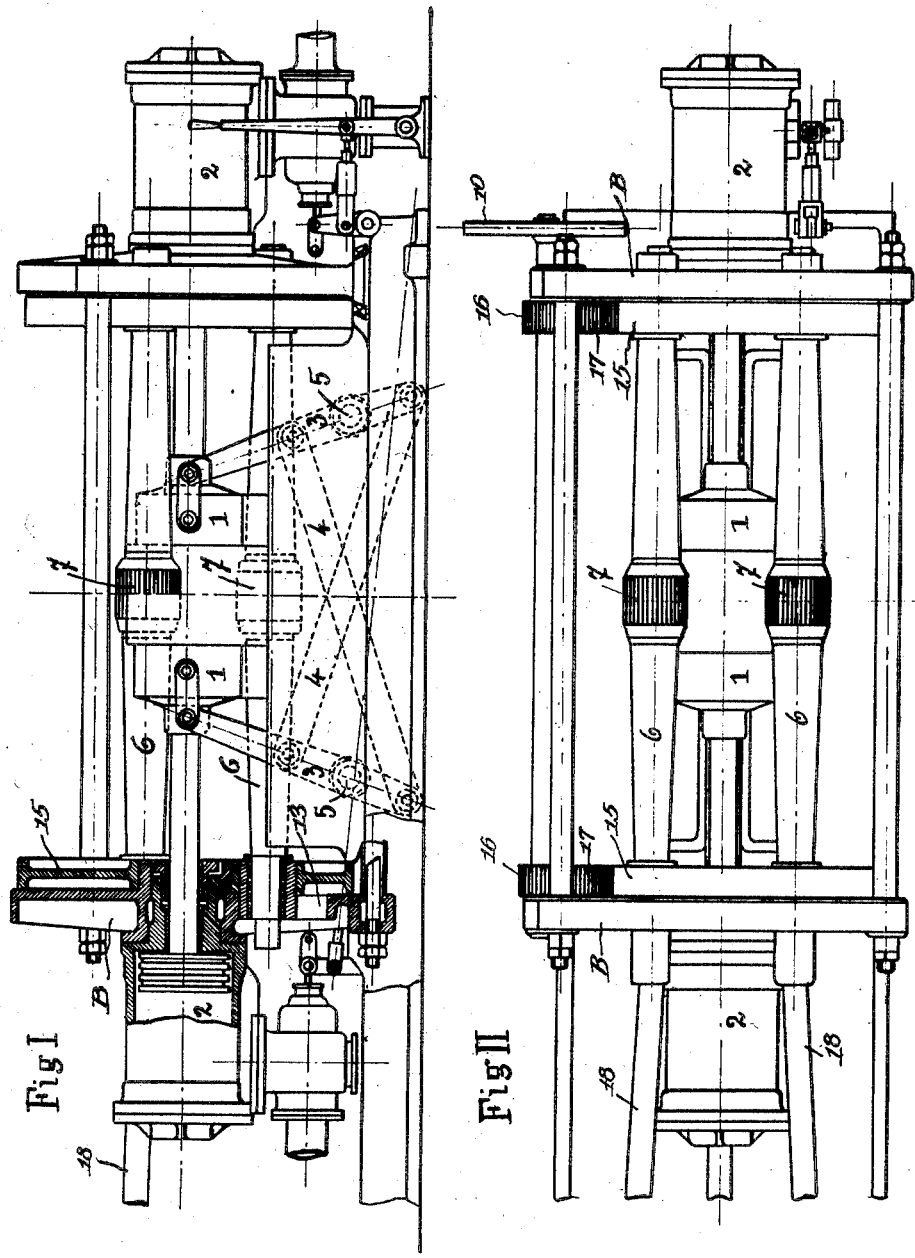

J. GIRLOT.
METHOD OF MANUFACTURING BY FORGING OR MATRICING CIRCULAR PIECES OF WORK
WITH A PROFILED PERIPHERY.
APPLICATION FILED NOV. 22, 1910.
1,068,236.
Patented July 22, 1913.
2 SHEETS—SHEET 2.
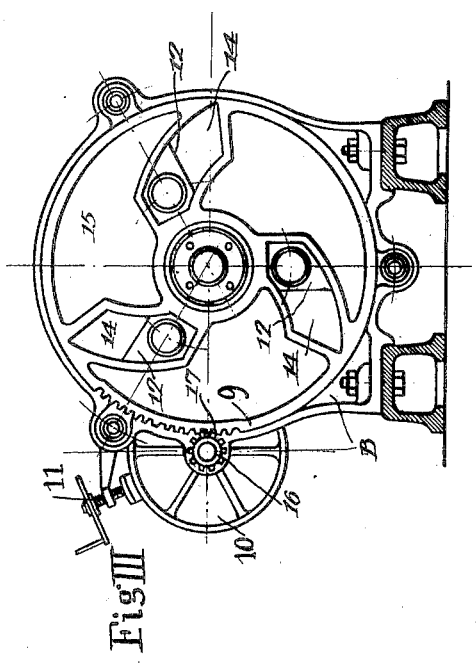
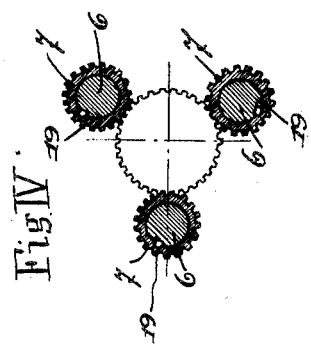
WITNESSES
L. H. Grote
W. E. Keir
INVENTOR
Joseph Girlot
BY
Howson and Howson
his ATTORNEYS

UNITED STATES PATENT OFFICE.

JOSEPH GIRLOT, OF LAEKEN, BRUSSELS, BELGIUM.

METHOD OF MANUFACTURING BY FORGING OR MATRICING CIRCULAR PIECES OF WORK WITH A PROFILED PERIPHERY.

1,068,236.  Specification of Letters Patent.  Patented July 22, 1913.

Application filed November 22, 1910. Serial No. 593,687.

*To all whom it may concern:*

Be it known that I, JOSEPH GIRLOT, a subject of the King of Belgium, and resident at Laeken, Brussels, Belgium, manufacturer, have invented a new Method of Manufacturing by Forging or Matricing Circular Pieces of Work with a Profiled Periphery, of which the following is a specification.

Among my former patents, that of January 31, 1911, No. 983,042 bears most closely upon the present construction. In this patent is described a machine for matrix forging circular objects by means of which their peripheries are operated on or worked upon by rollers which have a rotary motion.

This process in practice has shown that not only circular articles may be made having smooth or plain peripheries, but that those having shaped peripheries may also be produced when the rollers have the required shape.

The present invention relates to the manner or mode of producing these articles or objects such as gear wheels, grooved wheels, ribbed wheels and the like.

The annexed drawings illustrate by way of example, a machine arranged for the manufacture of gear wheels by the application of the method of forging referred to.

Figure 1 is partly a front elevation and partly a sectional view; Fig. 2 a plan; Fig. 3 an end view; and Fig. 4 a section across the sleeves.

This machine is composed essentially of two hammers 1, 1 actuated by pistons in the steam cylinders 2, 2, or by any other motive power, in such manner as to act simultaneously in opposite directions on the two faces of the work. The regularity of motion of these two pistons is insured by the levers 3 and 4 pivoted on the fixed points 5. On the three rollers 6 are placed the sleeves 7, provided with teeth corresponding to those of the work to be produced.

To make a gear wheel, I employ a disk casting or ingot or a rolled bar suitably heated. This disk should be of a diameter corresponding to the desired number of teeth and to the diameter of the finished piece, and the thicknesses are regulated by practice according to the shape and the various thicknesses of the gear wheel to be produced. This disk is placed between the rollers which have been previously separated for the purpose, they are then brought toward each other and given a rotary motion. They should be brought toward each other up to the point that the gear teeth are rough shaped and at this point their approach should be stopped. The rotation of the rollers 6 and their advance to and retreat from the blank are secured in substantially the manner described in my Patent 983,042. Thus they are mounted in bearings 12 radially slidable in guide slots 13 in the fixed heads B. These bearings 12 engage also in the cam slots 14 of the adjusting disks 15 rotatably mounted on hubs on the heads B. Rotation is imparted to these disks through the hand wheel 10, the pinions 16 of which mesh with toothed segments 17 on the periphery of each of the disks 15. Obviously as the disks 15 are rotated, the bearings 12 are forced radially inward or outward in the slots 13 through the cam action of the slots 14. The screw brake 11 acting on the hand wheel 10 holds the rolls in the position to which they are moved by the rotation of the hand wheel 10. In adjusted position the rolls 6 are rotated on their individual axes through the shafts 18 which may be driven in the manner described in the patent above mentioned. The adjustment of the rolls 6 is previously determined by means of a gage which is introduced between the rollers, the outer diameter of the gage corresponding to that of the work to be produced. This gage may be a finished piece. The continuation of the operation is effected by the hammers which in flattening the work so as to mold it, also enlarge it and force the teeth which have been roughly shaped by the rollers to take exactly the shape and size of those on the sleeves. The gear teeth are thus formed with great solidity and hardness.

The mode of approaching the rollers and fixing them may obviously be replaced by any other suitable arrangement for the purpose. It is understood that the dimensions of the blank, in size and in thickness would be regulated in accordance with the method of operating which is adopted in each case. The arrangement of the machine may be modified according to the description or kind of work or articles to be made.

In order to determine with precision the exact spacing apart of the several roll sleeves 7 to secure the desired diameter for the finished article and thus to properly position the automatic stop brake 11, the simplest procedure is to mesh the sleeves with a model or sample piece or article which is withdrawn when the sleeves have been exactly positioned.

The employment of the sleeves for shaping the periphery of circular articles has important advantages. They render it unnecessary to shape the peripheries of the heavy and expensive rollers 6 to form working faces shaped to the periphery of the article subjected to their action. When it is desired to change the character of the periphery on the blank all that is necessary is to substitute another sleeve of the desired form for the one then on the roller body, without having to replace the entire roller.

Obviously the expense of maintaining a variety of shapes is rendered very much less through the use of the sleeves, while the repair expense, due to wear, is confined substantially entirely to the sleeves which can be renewed at a cost far below that incident to replacing an entire roller. Further, the sleeves may be placed on the rollers in such manner as to enable them to be slid in the direction of the beat of the hammers as by mounting them on feathers 19 (Fig. 4). This longitudinal displacement is very necessary when the work has to be shaped after the manner of a shaped or grooved rim for a tire and when the beat of the hammers cannot be controlled with mathematical accuracy. It might happen in this case that if a fixed shaping element be used, the work would be subjected to a shearing action at the base of the grooved edge, but if a movable shaping sleeve be used, the latter will follow the work under any displacement and thus prevent any malformation through instability of center of the hammer blow.

I claim as my invention:

1. A method of forging a circular object with shaped periphery which consists in rotating a heated blank between peripherally arranged shaping rolls, the peripheries of which are shaped to impart the desired form to the blank with which they are in contact and simultaneously hammering the opposite faces of the blank whereby the material thereof is pressed radially outward and takes the contour of the periphery of the shaping rolls, substantially as described.

2. A method of forging a circular object with shaped periphery which consists in rotating a heated blank between peripherally arranged longitudinally displaceable shaping roll elements, the peripheries of which are shaped to impart the desired form to the blank with which they are in contact and simultaneously hammering the opposite faces of the blank whereby the material thereof is pressed radially outward and takes the contour of the periphery of the shaping roll elements, substantially as described.

3. A method of forging a circular object with shaped periphery, which consists in rotating a heated blank between peripherally arranged shaping rolls, the peripheries of which are shaped to impart the desired form to the blank with which they are in contact and axially compressing the blank by hammer blows to force the material thereof radially outward whereby the periphery of the blank is shaped to the periphery of the shaping rolls, substantially as described.

4. A method of forging a circular object with shaped periphery which consists in rough shaping the blank by rotating the same between peripherally arranged shaping rolls, the peripheries of which are shaped to impart the desired peripheral form to the blank with which they are in contact, said shaping rolls being gradually approached to each other during the rough shaping step, and then finishing the work by axially compressing the blank by hammer blows while the forming rolls are maintained spaced apart a constant distance, whereby the material of the blank is forced radially outward against the forming rolls, substantially as and for the purpose described.

5. A method of forging a circular object with shaped periphery which consists in rough shaping the blank by rotating the same between peripherally arranged longitudinally displaceable shaping roll elements, the peripheries of which are shaped to impart the desired peripheral form to the blank with which they are in contact, said shaping roll elements being gradually approached to each other during the rough shaping step, and then finishing the work by axially compressing the blank by hammer blows while the shaping rolls are maintained spaced apart a constant distance, whereby the material of the blank is forced radially outward against the shaping rolls, substantially as and for the purpose described.

In testimony whereof I have signed my name to this specification, in the presence of two subscribing witnesses.

JOSEPH GIRLOT.

Witnesses:
 GUSTAVE PIERRY,
 EMILE NUYTS.